United States Patent [19]

Ito et al.

[11] 4,131,781
[45] Dec. 26, 1978

[54] SUBMERGED ARC WELDING PROCESS FOR NICKEL CONTAINING STEEL

[75] Inventors: Yoshinori Ito; Mutsuo Nakanishi, both of Amagasaki, Japan

[73] Assignee: Sumitomo Metal Industries, Ltd., Osaka, Japan

[21] Appl. No.: 778,973

[22] Filed: Mar. 18, 1977

[51] Int. Cl.² ............................................... B23K 9/18
[52] U.S. Cl. ................................. 219/73; 219/145.22; 219/146.24; 219/146.3; 219/146.41
[58] Field of Search ............ 219/73 R, 137 WM, 146, 219/145.22, 146.1, 146.23, 146.24, 146.3, 146.31, 146.32, 146.41; 148/24, 26

[56] References Cited

U.S. PATENT DOCUMENTS

| 3,867,608 | 2/1975 | Ohwa et al. | 219/73 R |
| 3,868,491 | 2/1975 | Ito et al. | 219/73 R X |
| 3,919,517 | 11/1975 | Ishizaki et al. | 219/73 R |

Primary Examiner—Richard R. Kucia
Assistant Examiner—N. D. Herkamp
Attorney, Agent, or Firm—Fleit & Jacobson

[57] ABSTRACT

This invention provides a process involving submerged arc welding for nickel containing steel such as steel containing 3.5 weight percent of nickel. The process uses a bond type flux of specific composition to suppress the oxygen content in the weld metal. Further, the process utilizes a cored welding wire including a core material of specific composition. As the result, it is possible to obtain a weld metal of high impact-resistance at low temperatures such as minus 100° C.

11 Claims, No Drawings

SUBMERGED ARC WELDING PROCESS FOR NICKEL CONTAINING STEEL

The present invention relates to a submerged arc welding process and more particularly to a submerged arc welding process for nickel containing steel. More specifically, the present invention pertains to a submerged arc welding process for nickel containing steel which can provide a weld metal having an improved toughness. The present invention is particularly suitable for welding 3.5% nickel containing steel but is not limited to such purpose.

Conventionally, 3.5% nickel containing steel has been utilized for constructing vessels which are used for storing liquefied gas such as liquefied nitrogen, liquefied oxygen or the like. Since such vessels are constructed from the steel material by means of welding and subjected in use to an extreme cold temperature, it is very important to provide an adequate impact-resistant property at low temperatures such as below minus 100° C even at the welded portion. From the viewpoint of manufacture, it is of course desirable to perform the welding operation automatically making use of a submerged arc welding technique, however, since it has been difficult to ensure a satisfactory impact-resistant property through a conventional submerged arc welding, manually operated welding technique has been employed for the manufacture of such vessels so that thermal input at the welding portion can be maintained as low as possible to provide a weld metal of high toughness.

It has previously been proposed and actually been practised, in order to obtain an increased toughness in the weld metal, to increase the amount of nickel content in the weld metal. However, experiences have shown that the increase in the nickel content does not provide any improvement in the toughness but, rather, there has been an adverse effect thereon when the nickel content exceeds 3%. The reason for this tendency is that the increase in nickel content will not only result in an increase in the strength of the weld metal but, also, will result in a decrease in its toughness because the structure of the weld metal changes from ferrite to bainite. Thus, according to prior art, it has been very difficult to ensure an impact-resistant property at low temperatures such as below minus 100° C.

The present invention has as an object, therefore, to provide a submerged arc welding process which can provide a weld metal of improved toughness.

Another object of the present invention is to provide a novel submerged arc welding process for nickel containing steel which uses a bond type flux and a welding electrode of specific composition.

A further object of the present invention is to provide a submerged arc welding process which is particularly suitable, although not limited, to the welding of 3.5% nickel containing steel.

According to the present invention, the above and other objects can be accomplished by a submerged arc welding process for welding nickel containing steel with a welding electrode in the presence of a flux, said welding process being characterized in that;

A. said welding electrode is a cored wire consisting of a mild steel and core material, the core material including, on the basis of weight to the total weight of the welding electrode, 5 to 25 percent of $CaF_2$, 2.5 to 5.5 percent of nickel, 0 to 0.5 percent of Mo, 0 to 0.5 percent of Ti, B. said flux is bond type flux having a composition of, by weight percent, 10 to 30 percent of $SiO_2$, 8 to 20 percent of $Al_2O_3$, 25 to 45 percent of MgO, 10 to 30 percent of CaO, 7 to 20 percent of $CaF_2$, and at least one member selected from the group consisting of metallic Si, Fe-Si, and Fe-Si-Mn in an amount of 0 to 0.6 percent calculated in term of metallic Si, and having a basicity B higher than 1.5, the basicity being defined on the basis of weight by the following equation;

$$B = (CaO + MgO)/(SiO_2 + Al_2O_3)$$

Through extensive investigations in obtaining an improved toughness through the submerged arc welding of steel material of high nickel content, the inventors have found that the Si and C contents in the weld metal have an important effect on the property. More specifically, in case of a weld metal having a nickel content exceeding 2 percent, a decrease in silicon content and also a decrease in carbon content are effective to provide a high toughness at low temperatures. Particularly, with a weld metal having a silicon content not exceeding 0.20 percent and a carbon content not exceeding 0.08 percent, it has been ensured that a high impact-resistant property can be attained even at an extremely low temperature around minus 100° C. The reasons for such an improvement in toughness through the decreased carbon and silicon contents of weld metal have not been fully clarified but it is understood that the reduction in the carbon and silicon amounts is effective to suppress the increase in the strength of the weld metal including a relatively high percentages of nickel. In other words, with increased nickel content, reduction in the carbon and silicon contents acts to prevent excessive increase of strength and decrease of toughness.

However, in welding processes utilizing a melt type flux, it is very difficult to maintain the silicon content of the weld metal lower than 0.20 percent because the flux normally contains a large amount of $SiO_2$ and the basicity of the flux cannot be as high as desirable, whereby these will be a tendency that the $SiO_2$ content will be reduced in the slag which will be formed during the welding process, and the silicon content in the weld metal will correspondingly be increased. Thus, it is impractical to use such melt type flux for the purpose of the present invention and it is therefore essential for the present invention to utilize a bond type flux having a high basicity and less $SiO_2$ content.

The use of such bond type flux of high basicity may also be effective to decrease the oxygen content in the weld metal but there still exists surplus oxygen so that it is required to add de-oxydizing agents such as silicon, metallic silicon, Fe-Si, Fe-Si-Mn, metallic manganese and Fe-Mn. The amount of such de-oxydizing agents is very important because, when the agents are added excessively, they will cause an increase in the silicon content but if the amount is insufficient there will be produced welding defects such as blow-holes and there will also be a decrease in the toughness due to insufficient de-oxydization. Thus, in order to decrease the silicon content in the weld metal and to achieve an adequate de-oxydization, it is necessary to utilize a bond type flux having a low silicon content and a high basicity and, at the same time, to decrease the oxygen content in the pool of the molten metal produced during welding operation.

According to the present invention, a welding electrode of cored wire is employed because it provides a stable welding arc with a relatively large input. The welding electrode may be manufactured by turning over a mild steel hoop to form an elongated wire or tube and then incorporating the above-mentioned core material in the space defined in the tube. The hoop is preferably of a composition by weight of less than 0.15 percent of carbon, less than 1.0 percent of manganese and the balance of iron because of its workability.

It has been found that $CaF_2$ is very effective to decrease the oxygen content in the welding pool of the molten metal. The inventors found that the oxygen content in the molten metal could substantially be decreased in a submerged arc welding through a use of a bond type flux of high basicity in combination with a welding electrode of cored wire including $CaF_2$. The weld metal thus produced has been found substantially free from any defects such as blow-holes.

It is understood that $CaF_2$ in the core material of the welding electrode is subjected to a high temperature of the welding arc and vapourized and decomposed as soon as the electrode is molten, to produce a large amount of fluoric gas which serves to shield the arc space and the surface of the molten metal so as to prevent air or other gaseous impurities from reaching the molten metal. Thus, $CaF_2$ is effective to decrease the amounts of oxygen and other impurities in the molten metal.

Thus, it has been ensured that through a submerged arc welding utilizing a bond type flux of high basicity and a welding electrode of cored wire containing $CaF_2$, it is possible to produce a welded metal of low carbon and low silicon contents without causing any defects such as blow holes. Further, it has also been ensured that the silicon content in the weld metal can be maintained below 0.20% and the oxygen content below 400 ppm.

The inventors have further made investigations on the influence of Ni, Mo and/or Ti contents in the welding electrode on the weldability, the strength and the impact-resistant property at minus 100° C. As the result, the inventors have found that adequate impact-resistant property at minus 100° C cannot be stably provided unless the Ni content in the cored wire is maintained above 2.5%. On the other hand, it has also been found that excessive nickel content has a tendency of producing bainite structure even where the silicon content in the weld metal is very low, resulting in an unstable impact-resistant property at low temperatures. It is of course true that, even in this instance, the decrease in the toughness is not as significant as in the case where the weld metal contains more than 0.2 percent of silicon, however, in view of the expensive cost of nickel and in view of the fact that an excessive nickel content may be a cause of cracks at a high temperature, it is recommended that the nickel content in the welding electrode be maintained between 2.5 and 5.5 percent.

Molybdenum may be incorporated into the welding electrode in order to secure the strength of the welded part because there is a tendency for the strength of the welded part to be relatively low with low carbon and silicon contents. However, the Mo content should be limited lower than 0.5 percent because an increased Mo content has a tendency of producing a weld metal of bainite structure resulting in a remarkable decrease in the impact-resistant property at low temperatures.

Titanium may be also incorporated into the welding electrode as a de-oxydizing agent and further serves to make the weld metal of fine crystals and fine structures which are effective to improve the toughness of the weld metal. Although the titanium is thus effective to improve the toughness of the weld metal, the content must be maintained lower than 0.5 percent because the titanium content exceeding this value has a tendency of increasing the silicon content in the weld metal and of producing a bainite structure resulting in a decrease in the impact-resistant property at low temperatures.

With respect to the flux, the basicity is of importance because, under a basicity less than 1.5, the $SiO_2$ in the flux will be increased and the Si content in the weld metal is correspondingly increased. Further, with the basicity less than 1.5, there is also a tendency that the oxygen content in the weld metal is increased and blow holes are produced.

The $SiO_2$ has an influence on the melting point of the flux and where the $SiO_2$ content is less than 10 percent there will be an increase in the melting point of the flux so that adverse effects will be seen in the performance of the welding operation and also in the appearance of the welded beads. With the $SiO_2$ content exceeding 30 percent, the $SiO_2$ will be chemically reduced and there will be an increase in the Si content in the weld metal resulting in poor toughness of the weld metal.

The $Al_2O_3$ has an influence on the appearance of the welded beads and an acceptable range is between 8 and 20 percent. With the MgO content less than 25 percent, it will be difficult to maintain the basicity at a desirable level but where the content is greater than 45 percent the melting point of the flux will be increased to an unacceptable level. The CaO content should be greater than 10 percent in order to maintain the basicity within the desired range but it will have an adverse effect on the workability if it is increased beyond 30 percent.

The $CaF_2$ content should be greater than 7 percent in order to provide a satisfactory appearance of the welded beads. However, excessive addition of $CaF_2$ causes an unstable welding arc so that the content should be lower than 20 percent. In order to maintain the silicon content in the weld metal below 0.20 percent, it is required to maintain the silicon content of metallic Si, Fe-Si and Fe-Si-Mn in the flux to lower than 0.6 percent. Otherwise, there will be an adverse effect on the toughness at low temperature due to an increase in the silicon content in the weld metal. As mentioned above, the silicon containing deoxydizing agent may be metallic Si, Fe-Si, or Fe-Mn-Si. It is of course possible to use a material other than silicon as the deoxydizing agent. For example, manganese may be used for the purpose. Thus, the flux of the present invention may contain deoxydizing agent in an amount of less than 0.6% calculated in term of silicon.

Regarding the cored wire, it has been found that the $CaF_2$ content should be greater than 5 percent to the total weight of the wire. Otherwise, blow-holes are apt to be produced in the weld metal and there will be a decrease in the toughness. With the $CaF_2$ content greater than 5 percent, there is an remarkable decrease in the oxygen content in the molten metal so that blow holes are prevented and the toughness is improved. However, the $CaF_2$ content should not exceed 25 percent because an excessive $CaF_2$ content makes the welding arc unstable and causes poor workability.

In order to ensure an adequate impact-resistant property at minus 100° C, it is necessary to maintain the nickel content in the core wire in an amount of higher than 2.5 percent, however, where the content increases beyond 5.5 percent, it may cause cracks under high temperature.

Molybdenum may be incorporated into the cored wire for obtaining an increased strength of the weld metal but the content shall not exceed 0.5 percent because it may have an adverse effect on the impact-resistant property at low temperature where the Mo content is above this value.

Titanium may be also incorporated into the cored wire because it is effective to produce fine crystalline structures which serve to provide an improved impact-resistant property under low temperature. However, the titanium may be omitted because it is possible to obtain a satisfactory impact-resistant property around minus 100° C without titanium. Where the Ti content is greater than 0.5 percent, there will be a decrease in the toughness due to an increase in the silicon content in the weld metal.

Nickel, molybdenum and titanium in the core material may be incorporated into the welding electrode in the form of the ferrous alloy thereof, for example Fe-Ni, Fe-Mo and Fe-Ti. Fe-Ni, Fe-Mo or Fe-Ti may be incorporated into the electrode in the above mentioned amount calculated in terms of nickel, molybdenum or titanium. It is obvious of course that nickel, molybdenum or titanium may be added to the electrode in the form of elementary metal.

It has been found that, when a submerged arc welding using the aforementioned flux and welding electrode of cored wire is applied to 3.5% Ni containing steel, it is possible to produce a weld metal having an excellent toughness at low temperatures. It should be noted, however, that the submerged arc welding process in accordance with the present invention can also be applied to other types of nickel containing steel such as 2.5% Ni containing steel. Further, it should also be noted that the welding conditions may suitably be selected in practice.

The present invention will now be described by way of examples.

EXAMPLES

Butt welding operations were performed in specimens of 3.5% Ni containing steel (ASTMA 203D) of 25 mm thickness with a welding current of 600 A under 40 V and a welding speed of 40 cm/min. to form multiple layers of weld metal. The operations were performed in accordance with conventional processes as well as in accordance with the present invention. In the welding operations, metal sheets were shaped to have edges sloped by an angle of 20 degrees, and a pair of such sheets were placed at a minimum distance of 10 mm.

The welded specimens were subjected to tests for welding defects. The specimens were then formed with V-shaped notches and subjected to Charpy impact test at minus 100° C. The results are shown in the following table.

Table

| | Specimen | Type of Welding Electrode | Chemical Composition of Electrode (weight %) | | | | | Type of Flux | Chemical Composition of Flux (weight %) | | | | | | | Basicity | Obtained Welded Metal | |
|---|---|---|---|---|---|---|---|---|---|---|---|---|---|---|---|---|---|---|
| | | | CaF$_2$ | Ni | Mo | Ti | Mild Steel | | SiO$_2$ | Al$_2$O$_3$ | MgO | CaO | CaF$_2$ | Si | Mild Steel | | Workability | vE-100 (kg-m) |
| Control Ex. | A | Solid Wire | — | 3.6 | 0.5 | — | Balance | Melt Type | 35 | 10 | 29 | 20 | 6 | 0 | Balance | 1.1 | Good | 2.2 |
| | B | Solid Wire | — | — | — | — | Balance | Bond Type | 21 | 13 | 36 | 16 | 13 | 0 | Balance | 1.6 | Blow hole observed | 1.2 |
| | C | Solid Wire | — | — | — | — | Balance | Bond Type | 21 | 13 | 36 | 16 | 12 | 1.2 | Balance | 1.6 | Good | 0.8 |
| | D | Cored Wire | 10 | 2.0 | — | — | Balance | Bond type | 21 | 13 | 36 | 16 | 13 | 0.5 | Balance | 1.6 | Good | 3.1 |
| | E | Cored Wire | 10 | 2.7 | — | — | Balance | Bond Type | 25 | 12 | 23 | 17 | 22 | 0.5 | Balance | 1.3 | Blow holes observed | 1.4 |
| | F | Cored Wire | 4 | 3.5 | — | — | Balance | Bond Type | 21 | 13 | 36 | 16 | 13 | 0.5 | Balance | 1.6 | Blow holes observed | 2.2 |
| | G | Cored Wire | 10 | 5.8 | 0.6 | — | Balance | Bond Type | 18 | 12 | 32 | 22 | 15 | 0.5 | Balance | 1.8 | Good | 0.9 |
| | H | Cored Wire | 10 | 3.5 | 0.4 | 0.9 | Balance | Bond Type | 21 | 13 | 36 | 16 | 13 | 0.5 | Balance | 1.6 | Good | 1.3 |
| | I | Cored Wire | 28 | 3.5 | — | — | Balance | Bond Type | 18 | 12 | 32 | 22 | 15 | 0.5 | Balance | 1.8 | Dirty beads appearance | 8.1 |
| Ex. of the Invention | J | Cored Wire | 10 | 2.7 | 0.5 | — | Balance | Bond Type | 21 | 13 | 36 | 16 | 13 | 0.5 | Balance | 1.6 | Good | 5.7 |
| | K | Cored Wire | 12 | 3.5 | — | — | Balance | Bond Type | 21 | 13 | 36 | 16 | 13 | 0.3 | Balance | 1.6 | Good | 9.2 |
| | L | Cored Wire | 8 | 3.5 | — | 0.3 | Balance | Bond type | 21 | 13 | 36 | 16 | 14 | 0 | Balance | 1.6 | Good | 11.8 |
| | M | Cored Wire | 12 | 3.5 | 0.2 | — | Balance | Bond Type | 18 | 12 | 32 | 22 | 15 | 0.5 | Balance | 1.8 | Good | 7.5 |
| | N | Cored Wire | 10 | 5.0 | — | — | Balance | Bond Type | 18 | 12 | 32 | 22 | 15 | 0.5 | Balance | 1.8 | Good | 6.9 |

In the above table, the wire composition designates the constituents of core material in weight percentages with respect to the wire as a whole. Mild steel in the Table had a composition by weight, of 0.06 percent of carbon, 0.50 percent of manganese and the balance of iron. In the table, it will be noted that the specimen A shows unsatisfactory toughness because the welding employed a melt type flux with a low basicity. The specimen B shows blow holes due to insufficient deoxydization because the flux does not contain silicon. The specimen C does not have a satisfactory toughness because the process employed for the specimen uses a welding electrode of solid wire which did not provide adequate amount of oxygen. The specimen D shows unsatisfactory toughness due to insufficient nickel content. The specimen E has blow holes due to insufficient deoxydization because the flux used for the specimen had lower basicity.

The specimens J through N which have been welded in accordance with the present invention show satisfactory impact resistance under low temperature. In the specimen L, the flux did not contain Si but deoxydization was effected due to the existence of Ti.

The specimen F had blow holes which were produced due to insufficient content of $CaF_2$ in the welding wire. The specimen G had been welded with a welding wire containing excessive amount of nickel. As the result, the weld metal did not possess a satisfactory toughness. The specimen H had been welded with the welding wire containing excessive titanium and as a result the weld metal had insufficient toughness. The specimen I had an unacceptable appearance of welded beads due to excessive amount of $CaF_2$ in the welding wire.

The invention has thus been shown and described with reference to examples but it should be noted that modifications may be made without departing from the scope of the appended claims.

We claim:

1. A submerged arc welding process for welding nickel containing steel with a welding electrode in the presence of a flux, said welding process being characterized in that;
    A. said welding electrode is a cored wire consisting of a mild steel and core material, the core material including, on the basis of weight to the total weight of the welding electrode, 5 to 25 percent of $CaF_2$, 2.5 to 5.5 percent of nickel, 0 to 0.5 percent of Mo, 0 to 0.5 percent of Ti, and
    B. said flux is a bond type flux having a composition of, by weight percent, 10 to 30 percent of $SiO_2$, 8 to 20 percent $Al_2O_3$, 25 to 45 percent of MgO, 10 to 30 percent of CaO, 7 to 20 percent of $CaF_2$, and at least one member selected from the group consisting of metallic Si, Fe-Si, and Fe-Si-Mn in an amount of 0 to 0.6 percent calculated in term of metallic Si, and having a basicity B higher than 1.5, the basicity being defined on the basis of weight by the following equation;

$$B = (CaO + MgO)/(SiO_2 + Al_2O_3)$$

2. A submerged arc process as claimed in claim 1, wherein said electrode consists of a mild steel hoop turned over to form an elongated tube, and the core material is contained in the space defined by the turned mild steel hoop.

3. A submerged arc welding Process as claimed in claim 2, wherein said mild steel hoop has a composition of, by weight percent, less than 0.15 percent of C, less than 1.0 percent of Mn and the balance consisting essentially of Fe.

4. A submerged arc welding process as claimed in claim 2, wherein said core material consists essentially of $CaF_2$, metallic Ni, Fe-Mo, and Fe-Ti.

5. A submerged arc welding process as claimed in claim 1, wherein said nickel containing steel contains about 3.5 percent by weight of nickel.

6. A submerged arc welding process for welding steel containing nickel comprising welding the steel with a welding electrode in the presence of a bond-type flux,
    (a) said welding electrode being a cored wire consisting of a mild steel and a core material, the core material containing, in percent by weight based on the total weight of the welding electrode, from 5 to 25 percent of $CaF_2$, from 2.5 to 5.5 percent of Ni, from 0 to 0.5 percent of Mo, and from 0 to 0.5 percent of Ti; and
    (b) said bond-type flux having a composition containing, in percent by weight, from 10 to 30 percent of $SiO_2$, from 8 to 20 percent of $Al_2O_3$, from 25 to 45 percent of MgO, from 10 to 30 percent of CaO, from 7 to 20 percent of $CaF_2$, and at least one deoxidizing agent selected from the group consisting of metallic Si, Fe-Si, Fe-Si-Mn, metallic Mn, and Fe-Mn in an amount of 0 to 0.6 percent calculated in terms of metallic Si, said flux having a basicity (B) higher than 1.5, the basicity being defined, on a weight basis, by the following equation:

$$B = (CaO + MgO)/(SiO_2 + Al_2O_3),$$

thereby to produce a weld metal having a high impact-resistant property at a temperature below minus 100° C, and having a silicon content not exceeding 0.20%, a carbon content not exceeding 0.08%, and an oxygen content not exceeding 400 ppm.

7. The process of claim 6 wherein the welding electrode consists of a mild steel hoop turned over to form an elongated tube, and the core material is contained in the space defined by the turned mild steel hoop.

8. The process of claim 7 wherein the mild steel hoop contains, in percent by weight, less than 0.15% of carbon, less than 1.0% of manganese, with the remainder consisting essentially of iron.

9. The process of claim 6 wherein the nickel, molybdenum, and titanium are each present in the core material in its metallic form or in the form of its ferrous alloy.

10. The process of claim 9 wherein the core material consists essentially of $CaF_2$, metallic Ni, Fe-Mo, and Fe-Ti.

11. The process of claim 6 wherein the steel contains about 3.5% by weight of nickel.

* * * * *